United States Patent
Bonhoure et al.

(10) Patent No.: US 9,987,927 B2
(45) Date of Patent: Jun. 5, 2018

(54) METHOD FOR OPERATING A COMMUNICATION DEVICE FOR A MOTOR VEHICLE DURING AN AUTONOMOUS DRIVE MODE, COMMUNICATION DEVICE AS WELL AS MOTOR VEHICLE

(71) Applicant: VALEO Schalter und Sensoren GmbH, Bietigheim-Bissingen (DE)

(72) Inventors: Patrick Bonhoure, Bietigheim-Bissingen (DE); Siav Kuong Kuoch, Bietigheim-Bissingen (DE); Katharina Hottelart, Bietigheim-Bissingen (DE)

(73) Assignee: VALEO Schalter und Sensoren GmbH, Bietigheim-Bissingen (DE)

(*) Notice: Subject to any disclaimer, the term of this patent is extended or adjusted under 35 U.S.C. 154(b) by 0 days. days.

(21) Appl. No.: 15/557,581

(22) PCT Filed: Mar. 14, 2016

(86) PCT No.: PCT/EP2016/055392
§ 371 (c)(1),
(2) Date: Sep. 12, 2017

(87) PCT Pub. No.: WO2016/146558
PCT Pub. Date: Sep. 22, 2016

(65) Prior Publication Data
US 2018/0056787 A1 Mar. 1, 2018

(30) Foreign Application Priority Data
Mar. 16, 2015 (DE) .................. 10 2015 103 773

(51) Int. Cl.
*B60Q 1/00* (2006.01)
*B60K 37/06* (2006.01)

(52) U.S. Cl.
CPC ........ *B60K 37/06* (2013.01); *B60K 2350/965* (2013.01)

(58) Field of Classification Search
CPC .......................... B60K 37/06; B60K 2350/965
See application file for complete search history.

(56) References Cited

U.S. PATENT DOCUMENTS

| | | | |
|---|---|---|---|
| 6,836,719 B2 * | 12/2004 | Andersson | B60K 31/0058 123/352 |
| 8,700,251 B1 * | 4/2014 | Zhu | G05D 1/02 701/25 |

(Continued)

FOREIGN PATENT DOCUMENTS

| | | |
|---|---|---|
| DE | 10 2009 041 587 A1 | 3/2011 |
| DE | 10 2009 048 493 A1 | 4/2011 |

(Continued)

OTHER PUBLICATIONS

International Search Report issued in PCT/EP2016/055392 dated Jun. 24, 2016 (2 pages).

(Continued)

*Primary Examiner* — Joseph Feild
*Assistant Examiner* — Rufus Point
(74) *Attorney, Agent, or Firm* — Osha Liang LLP

(57) ABSTRACT

The invention relates to a method for operating a communication device (2) for a motor vehicle (1), in which operating data of at least one operating component (4) of the motor vehicle (1) is provided by means of an interface device (3) of the motor vehicle (1) and transmitted to a mobile apparatus (8) disposed in an interior (10) of the motor vehicle (1), and the operating data is displayed on a display device (11) of the mobile apparatus (8), wherein it is examined by means of the interface device (3) if the motor vehicle (1) is operated in an autonomous drive mode, and if the motor vehicle (1) is operated in the autonomous drive (Continued)

Figure 1:
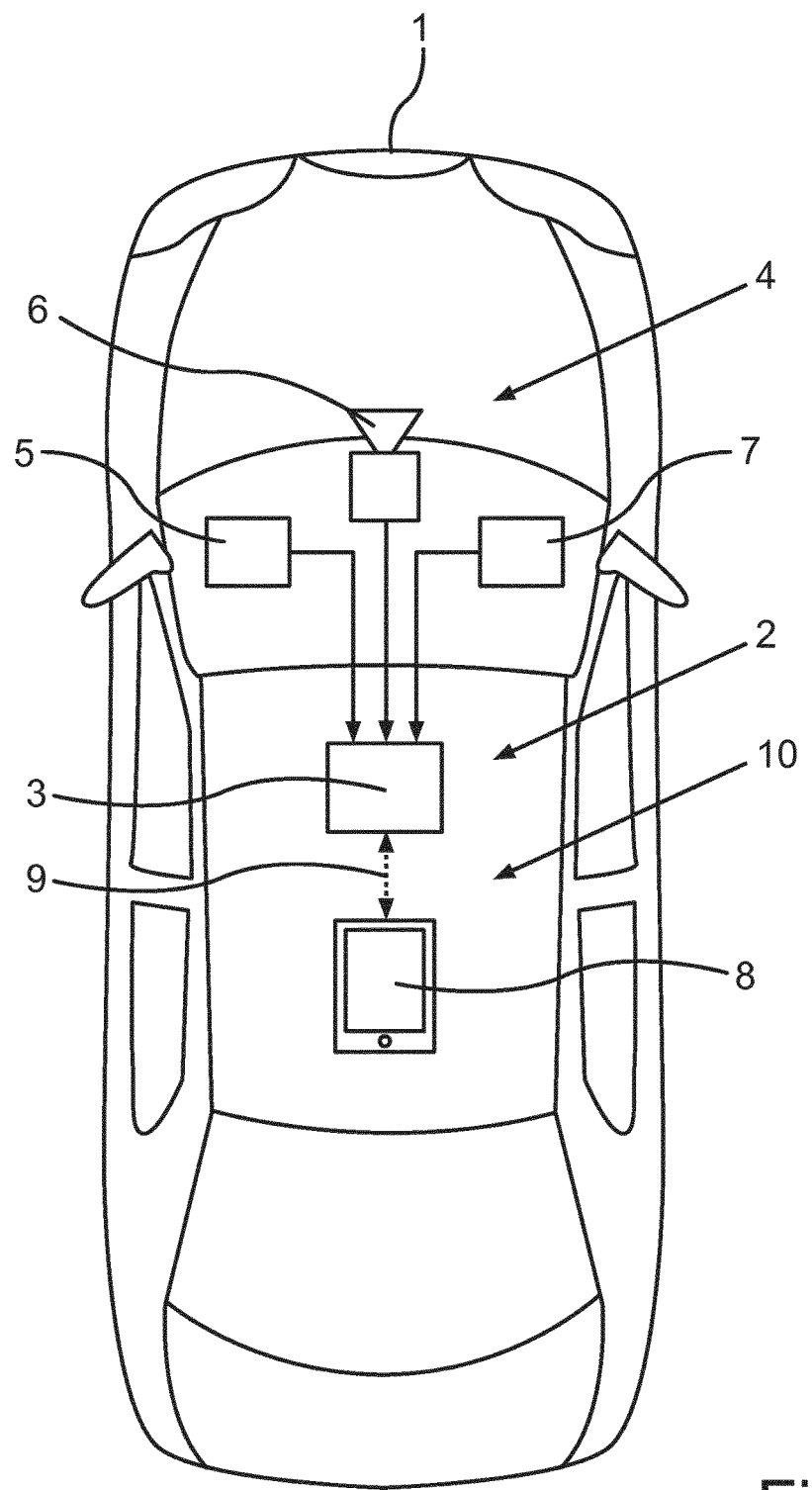

mode, the mobile apparatus (8) is operated in a first operating mode, wherein the operating data is displayed on the display device (11) only in the first operating mode.

8 Claims, 3 Drawing Sheets

(56) References Cited

U.S. PATENT DOCUMENTS

| | | | | |
|---|---|---|---|---|
| 8,818,608 | B2* | 8/2014 | Cullinane | B60W 30/00 |
| | | | | 701/23 |
| 8,892,293 | B2* | 11/2014 | Reichel | G06F 17/00 |
| | | | | 701/23 |
| 9,251,631 | B2* | 2/2016 | Thompson | G07C 5/008 |
| 9,272,708 | B2* | 3/2016 | Cuddihy | B60R 11/0229 |
| 9,333,983 | B2* | 5/2016 | Lathrop | B62D 1/04 |
| 9,505,383 | B2* | 11/2016 | Peel | B60T 7/16 |
| 9,682,609 | B1* | 6/2017 | Dudar | B60H 1/00764 |
| 9,767,516 | B1* | 9/2017 | Konrardy | G06Q 40/08 |
| 9,809,158 | B2* | 11/2017 | Geller | B60Q 1/50 |
| 9,821,817 | B2* | 11/2017 | Desnoyer | B60W 30/12 |
| 9,840,257 | B2* | 12/2017 | Ebina | B60W 40/08 |
| 9,854,085 | B2* | 12/2017 | Choi | H04W 4/027 |
| 2011/0128453 | A1* | 6/2011 | Cho | G03B 21/28 |
| | | | | 348/744 |
| 2016/0264021 | A1* | 9/2016 | Gillett | B60K 1/04 |
| 2017/0088038 | A1* | 3/2017 | Geller | B60Q 1/50 |

FOREIGN PATENT DOCUMENTS

| | | |
|---|---|---|
| DE | 10 2011 101 808 A1 | 11/2012 |
| DE | 10 2012 007986 A1 | 10/2013 |
| WO | 2015/014894 A2 | 2/2015 |

OTHER PUBLICATIONS

Written Opinion of the International Searching Authority issued in PCT/EP2016/055392 dated Jun. 24, 2016 (5 pages).

German Search Report issued in DE 10 2015 103 773.4 dated Feb. 10, 2016 (12 pages).

* cited by examiner

METHOD FOR OPERATING A COMMUNICATION DEVICE FOR A MOTOR VEHICLE DURING AN AUTONOMOUS DRIVE MODE, COMMUNICATION DEVICE AS WELL AS MOTOR VEHICLE

The present invention relates to a method for operating a communication device for a motor vehicle, in which operating data of at least one operating component of the motor vehicle is provided by means of an interface device of the motor vehicle and is transmitted to a mobile apparatus disposed in an interior of the motor vehicle, and the operating data is displayed on a display device of the mobile apparatus. In addition, the invention relates to a communication device for a motor vehicle. Finally, the present invention relates to a motor vehicle with such a communication device.

Presently, the interest is directed to communication devices for motor vehicles. Such communication devices serve for allowing a communication or data transmission between an interface device of the motor vehicle and a mobile apparatus. The mobile apparatus can for example be a mobile phone or a portable computer. If the mobile apparatus is in the interior of the motor vehicle, data transmission between the mobile apparatus and the interface device of the motor vehicle can be provided such that data can for example be reproduced by the mobile apparatus in the motor vehicle. Further, it is possible to reproduce operating data of an operating component of the motor vehicle on the mobile apparatus.

Hereto, DE 10 2011 101 808 A1 describes a method for providing a user interface in a vehicle, in which a wireless data connection between the vehicle and a mobile reproducing apparatus detachably connected in the vehicle or freely held by a user in the vehicle is established. Herein, data for generating a display content can be transmitted from the vehicle to the reproducing apparatus via the wireless data connection and a display content can be generated on the reproducing apparatus based on the transmitted data. Therein, it can also be provided that images of a forward directed camera are presented on the mobile reproducing apparatus, for example a tablet PC.

It is the object of the present invention to demonstrate a solution, how a functional range of a communication device of the initially mentioned kind can be extended.

This object is solved by a method, by a communication device as well as by a motor vehicle having the features according to the respective independent claims.

Advantageous implementations of the invention are the subject matter of the dependent claims, of the description and of the figures.

A method according to the invention serves for operating a communication device for a motor vehicle. Herein, operating data of at least one operating component of the motor vehicle is provided by means of an interface device of the motor vehicle and transmitted to a mobile apparatus disposed in an interior of the motor vehicle. Further, the operating data is displayed on a display device of the mobile apparatus. Moreover, it is examined if the motor vehicle is operated in an autonomous drive mode by means of the interface device, and if the motor vehicle is operated in the autonomous drive mode, the mobile apparatus is operated in a first operating mode, wherein the operating data is displayed on the display device only in the first operating mode.

The communication device includes an interface device, which is part of the motor vehicle. Operating data of an operating component of the motor vehicle can be acquired and provided by the interface device. Such an operating component can for example be a navigation system, a camera or the like. A current drive state such as for example the current speed, the current acceleration or the like can also be provided by the operating component. The operating data can be transmitted from the operating component to the interface device. By means of the interface device, then, a data connection to the mobile apparatus can be provided. The mobile apparatus is in particular a portable apparatus disposed in the interior of the motor vehicle. The mobile apparatus can also be reversibly detachably disposed in the motor vehicle. The mobile apparatus can for example be a mobile radio apparatus, a portable computer or a tablet. The mobile apparatus has a display device in the form of a screen, on which the operating data can be optically presented.

By the interface device, it can now be examined if the motor vehicle is operated in an autonomous drive mode. In the autonomous drive mode, the motor vehicle can be operated without influence of a human driver. In this case, the motor vehicle can capture the environment of the motor vehicle with the aid of various sensors and determine the relative position of the motor vehicle to other traffic participants or objects in the environmental region of the motor vehicle from it. In cooperation with a corresponding navigation system, a drive destination can be headed for and the vehicle can be navigated such that collisions are avoided. Therein, it can also be provided that the motor vehicle is operated in various automatization levels. If it is recognized by the interface device that the motor vehicle is operated in an autonomous drive mode, the mobile apparatus is operated in a first operating mode. Therein, it is provided that the operating data is presented on the display device of the mobile apparatus only in the first operating mode. In other words, the operating data of the operating component of the motor vehicle is only presented on the display device of the mobile apparatus if the motor vehicle is in an autonomous drive mode. Thus, the operating data describing the operation of the motor vehicle can be presented to the driver on the mobile apparatus during the autonomous drive mode. Thereby, the driver of the motor vehicle is further informed about the operation of the motor vehicle.

Preferably, upon a transition from a manual drive mode to the autonomous drive mode, a control signal is transmitted from the interface device to the mobile apparatus and the mobile apparatus is operated in the first operating mode after receiving the control signal. In the manual drive mode, the driver in particular takes over the longitudinal guidance and the lateral guidance of the motor vehicle. This means that the driver steers the motor vehicle as well as actuates the brake pedal and the accelerator. If a transition from the manual drive mode to the autonomous drive mode follows, a control signal is transmitted from the interface device to the mobile apparatus. Thereupon, the mobile apparatus can be transferred into the first operating mode. In this first operating mode, the operating data is then presented on the display device of the mobile apparatus.

In an embodiment, a first area of the display device is predetermined by means of the mobile apparatus, and the operating data is displayed on the first, predetermined area. The mobile apparatus can have a corresponding computing device, for example a processor, on which an operating system is run. With the aid of the computing device, a first area of the display device can be determined, on which the operating data is presented. This area can for example be an edge area of the display device. Thus, the display of the display device can be adapted with the aid of the computing device such that the operating data can be additionally presented to the driver of the motor vehicle.

Furthermore, it is advantageous if data is displayed on a second area of the display device different from the first area, which is provided by an operating system of the mobile apparatus. In other words, the data is displayed in the second area of the display device, which is usually displayed by the mobile apparatus. The driver or user can therefore further control the mobile apparatus. Therein, the spatial dimensions of the first and/or the second area of the display device can additionally be adapted by the user. This further allows the control of the mobile apparatus to the user, wherein information of at least one operating component of the motor vehicle is additionally provided to him.

In a development, an image sequence captured by at least one camera of the motor vehicle, which describes at least one region of the environment of the motor vehicle, is provided by means of the interface device and displayed on the display device as the operating data. In this case, the at least one operating component is a camera of the motor vehicle. By this camera, an image sequence or video data can be provided, which describes the environment of the motor vehicle. Therein, the video data can also be provided by multiple cameras disposed distributed on the motor vehicle. Thus, for example, a panoramic view around the motor vehicle can be allowed. This video data can for example be transmitted from the interface device to the mobile apparatus in real time. Thus, video data of the environment of the motor vehicle can be provided to the driver during the control of the mobile apparatus.

In a further development, navigation data of a navigation system of the motor vehicle is provided by means of the interface device as the operating data and displayed on the display device. The navigation system can for example serve for navigating the motor vehicle from a starting point to a destination point. Herein, the navigation data can include the remaining distance to the destination point, the current position of the motor vehicle and/or corresponding driving indications. Thus, the user or driver can further be informed about the course of the road.

In a further embodiment, the operating data displayed on the display device describes the autonomous drive mode of the motor vehicle. The operating data can for example describe that the motor vehicle is currently operated in the autonomous drive mode. Furthermore, it can for example be displayed, in which automatization level the motor vehicle is operated. Furthermore, the current speed, an engine speed or the like can be displayed to the driver as the operating data.

Furthermore, it is advantageous if the operating data is transmitted from the interface device to the mobile apparatus in wired or wireless manner. The operating data can for example be transmitted from the interface device to the mobile apparatus with the aid of a corresponding data cable. Alternatively thereto, the operating data can be wirelessly transmitted from the interface device to the mobile apparatus.

In a further embodiment, the first operating mode is terminated upon a transition from the autonomous drive mode to a manual drive mode and the mobile apparatus is operated in a second operating mode. If the transition from the autonomous drive mode to the manual drive mode is effected, the mobile apparatus can be operated in a second operating mode. In this second operating mode, display of the operating data on the display device can then not be effected. In the second operating mode, it can additionally be provided that only display elements are provided to the driver, which are associated with corresponding basic functions of the mobile apparatus. Thus, it can be ensured that the driver is not distracted from the driving occurrence during the manual drive mode.

A communication device according to the invention for a motor vehicle is adapted to perform a method according to the invention. The communication device can have an interface device, which is part of the motor vehicle. The interface device can be connected to an operating component of the motor vehicle for data transmission. Further, the communication device can include the mobile apparatus.

A motor vehicle according to the invention includes a communication device according to the invention. The motor vehicle is in particular formed as a passenger car. The motor vehicle can further have a driver assistance system, by which the motor vehicle can be autonomously operated or can be operated in an autonomous drive mode.

The preferred embodiments presented with respect to the method according to the invention and the advantages thereof correspondingly apply to the communication device according to the invention as well as to the motor vehicle according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone, without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim.

Now, the invention is explained in more detail based on preferred embodiments as well as with reference to the attached drawings.

Figure 2:
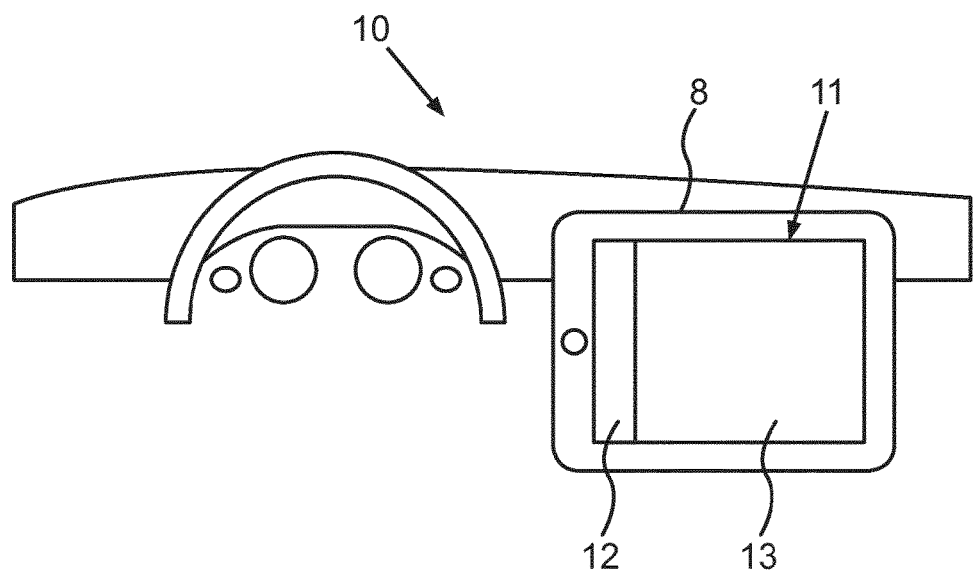
Figure 3:
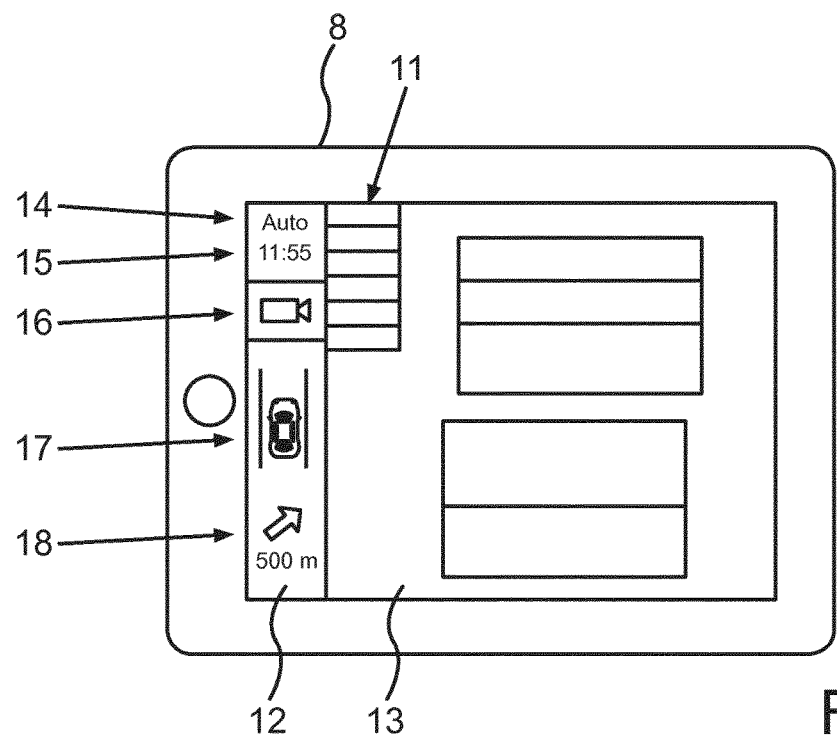
Figure 4:
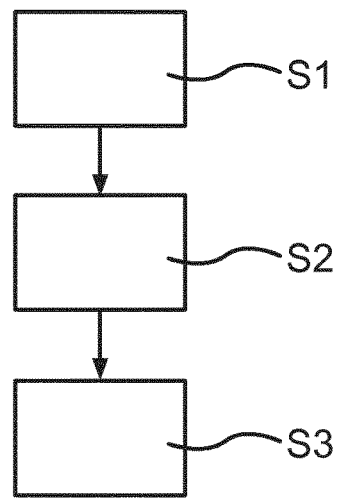
Figure 5:
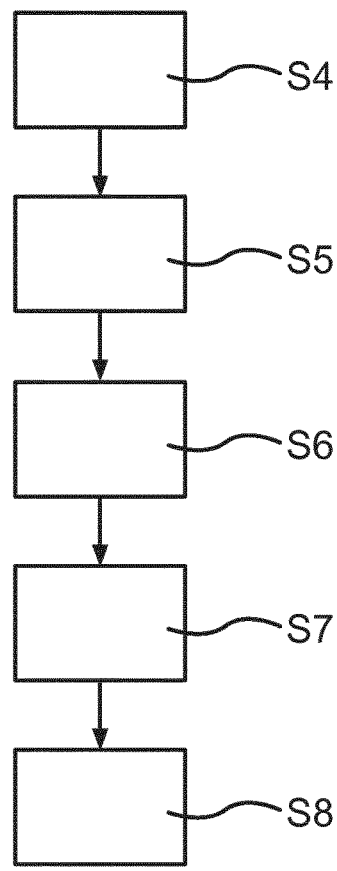

There show:

FIG. 1 in schematic illustration a motor vehicle according to an embodiment of the present invention, which has a communication device;

FIG. 2 a mobile apparatus of the communication device, which is disposed in an interior of the motor vehicle;

FIG. 3 the mobile apparatus of the communication device;

FIG. 4 a schematic flow diagram of a method for operating a communication device; and FIG. 5 the method according to FIG. 4 in a further embodiment.

In the figures, identical and functionally identical elements are provided with the same reference characters.

FIG. 1 shows a motor vehicle 1 according to an embodiment of the present invention in a plan view. The motor vehicle 1 is formed as a passenger car in the present embodiment. The motor vehicle 1 includes a communication device 2. The communication device 2 in turn includes an interface device 3. The interface device 3 is connected to at least one operating component 4 of the motor vehicle 1 for data transmission. In the present embodiment, the interface device 3 is connected to three operating components 4 of the motor vehicle 1 for data transmission.

The motor vehicle 1 further includes a driver assistance system not illustrated here. The driver assistance system serves for operating the motor vehicle 1 in an autonomous drive mode. In the autonomous drive mode, the driver assistance system can perform an intervention in the steering, a drive engine and/or a brake system of the motor vehicle 1. Further, in the autonomous drive mode, the environment of the motor vehicle 1 can be captured with the aid of sensors of the driver assistance system and the motor vehicle 1 can be maneuvered such that collisions with objects in the environment are prevented. The motor vehicle 1 can additionally be operated in a manual drive mode, in which the driver of the motor vehicle 1 actuates the brake as well as the accelerator.

As a first operating component 4, the motor vehicle 1 includes a navigation system 5. By the navigation system 5, a route for the motor vehicle 1 from a starting point to a destination point can be calculated. The navigation system 5 can additionally be connected to a satellite-based positioning system. As a second operating component 4, the motor vehicle 1 includes a camera 6. By the camera 6, an image sequence or video data of the environment of the motor vehicle 1 can be captured. As a third operating component 4, the motor vehicle 1 includes a driving control unit 7. By the driving control unit 7, for example, a current speed of the motor vehicle 1 can be acquired. In addition, the driving control unit 7 can be connected to the driver assistance system. Thus, it can be determined by the driving control unit 7 if the motor vehicle 1 is operated in the manual drive mode or an autonomous drive mode. In addition, it can be determined, in which automatization levels the motor vehicle 1 is operated.

The operating data, which is provided by the operating components 4 of the motor vehicle 1, is transmitted from the respective operating components 4 to the interface device 3. From the interface device 3, the operating data can be transmitted to a mobile apparatus 8. The mobile apparatus 8 is for example a mobile phone or a tablet, which is disposed in an interior 10 of the motor vehicle 1. Between the interface device 3 and the mobile apparatus 8, a data connection 9 is provided. The data connection can be wired or wireless.

FIG. 2 shows the interior 10 of the motor vehicle 1, in which the mobile apparatus 8 is exemplarily disposed. In the present embodiment, the mobile apparatus 8 is formed as a tablet. The mobile apparatus 8 includes a display device 11 in the form of a screen. The display device 11 is divided into a first area 12 and a second area 13. In the first area 12, the operating data provided by the operating components 4 can be displayed. In the second area 13, data can be provided by means of an operating system of the mobile apparatus 8.

FIG. 3 shows a detailed view of the mobile apparatus 8. Here, it is recognizable that different operating data is provided to the driver or user in the first area 12. For example, the symbol 14 "auto" is displayed to the driver, that the motor vehicle 1 is currently operated in the autonomous drive mode. In addition, in the first area 12, the period of time 15 is displayed, which describes how long the motor vehicle 1 is already operated in the autonomous drive mode. Further, a button 16 is provided to the driver in the first area 12, which he can control to retrieve video data from the camera 6. In addition, it is displayed to the driver in the first area 12 based on the symbol 17, on which lane the motor vehicle is currently located. In addition, navigation data 18 is provided. In the second area 13, contents are provided, which are provided by an operating system of the mobile apparatus 8. Such data or contents can be a web page, an email program, image data or movie data. Thus, it is allowed to the driver to both control the mobile apparatus 8 as usual and additionally to provide information about the operating data during the autonomous drive mode of the motor vehicle 1.

FIG. 4 shows a schematic flow diagram of a method according to the invention for operating the communication device 2. In a step S1, operating data is transmitted from the operating components 4 to the interface device 3. This operating data is then provided by the interface device 3. In a step S2, a communication connection between the interface device 3 and the mobile apparatus 8 is provided. This communication connection can be effected in wired or wireless manner. The mobile apparatus 8 can be connected to the interface device 3 for data transmission. Finally, in a step S3, a control signal is transmitted from the interface device 3 to the mobile apparatus 8. After receiving the control signal, the mobile apparatus 8 is operated in a first operating mode. In the first operating mode, operating data is presented on the display device 11 of the mobile apparatus 8.

FIG. 5 shows the method according to FIG. 4 in a further embodiment. Therein, in a step S4, the motor vehicle 1 is operated in the autonomous drive mode. In a step S5, the first area on the display device 11 is determined by the mobile apparatus 8 or a computing device of the mobile apparatus 8, on which the operating data is to be presented. In a step S6, the mobile apparatus 8 is connected to the control device 3 for data transmission. In a step S7, the operating data is transmitted from the control device 3 to the mobile apparatus 8. Finally, in a step S8, the operating data is presented in the first area 12 of the display device 11. Thus, the driver is further informed about the operating state of the operating components 4 or the operating state of the motor vehicle 1 in controlling the mobile apparatus 8.

The invention claimed is:

1. A method for operating a communication device for a motor vehicle, comprising:
   providing operating data of at least one operating component of the motor vehicle by an interface device of the motor vehicle;
   transmitting the operating data to a mobile apparatus disposed in an interior of the motor vehicle; and
   displaying the operating data on a display device of the mobile apparatus,
   wherein the interface device examines whether the motor vehicle is operated in an autonomous drive mode, and when the motor vehicle is operated in the autonomous drive mode, the mobile apparatus is operated in a first operating mode, wherein the operating data is displayed on the display device only in the first operating mode while a first area of the display device is predetermined by the mobile apparatus and the operating data is displayed on the first, predetermined area,
   wherein the operating data presented on the display device describes the autonomous drive mode of the motor vehicle, and
   wherein, on a second area of the display device different from the first area, data is displayed, which is provided by an operating system of the mobile apparatus.

2. The method according to claim 1, wherein upon a transition from a manual drive mode to the autonomous drive mode, a control signal is transmitted from the interface device to the mobile apparatus and the mobile apparatus is operated in the first operating mode after receiving the control signal.

3. The method according to claim 1, wherein an image sequence captured by at least one camera of the motor vehicle, which describes at least one region of an environment of the motor vehicle, is provided by the interface device and displayed by the display device as the operating data.

4. The method according to claim 1, wherein navigation data of a navigation system of the motor vehicle is provided by the interface device and displayed by means of the display device as the operating data.

5. The method according to claim 1, wherein the operating data is transmitted from the interface device to the mobile apparatus in wired or wireless manner.

6. The method according to claim 1, wherein the first operating mode is terminated upon a transition from the autonomous drive mode to a manual drive mode and the mobile apparatus is operated in a second operating mode.

7. A communication device for a motor vehicle, which is configured to perform a method according to claim 1.

8. A motor vehicle with a communication device according to claim 7.

* * * * *